US009431909B2

(12) United States Patent
Strijker (10) Patent No.: US 9,431,909 B2
(45) Date of Patent: Aug. 30, 2016

(54) SYNCHRONOUS RECTIFIER CONTROLLER FOR A SWITCHED MODE POWER SUPPLY

(71) Applicant: NXP B.V., Eindhoven (NL)

(72) Inventor: Arjan Strijker, Nijmegem (NL)

(73) Assignee: NXP B.V., Eindhoven (NL)

( * ) Notice: Subject to any disclaimer, the term of this patent is extended or adjusted under 35 U.S.C. 154(b) by 79 days.

(21) Appl. No.: 14/509,952

(22) Filed: Oct. 8, 2014

(65) Prior Publication Data

US 2015/0146457 A1 May 28, 2015

(30) Foreign Application Priority Data

Nov. 26, 2013 (EP) .................................... 13194509

(51) Int. Cl.
| H02M 3/158 | (2006.01) |
| H02M 1/08 | (2006.01) |
| H02M 3/335 | (2006.01) |
| H02M 1/00 | (2006.01) |

(52) U.S. Cl.
CPC ............ *H02M 3/1588* (2013.01); *H02M 1/08* (2013.01); *H02M 3/33592* (2013.01); *H02M 2001/0054* (2013.01); *Y02B 70/1466* (2013.01); *Y02B 70/1475* (2013.01); *Y02B 70/1491* (2013.01)

(58) Field of Classification Search
CPC .................................................. H02M 3/1588
See application file for complete search history.

(56) References Cited

U.S. PATENT DOCUMENTS

| 7,636,249 | B2 * | 12/2009 | Hu ..................... H02M 3/33592 363/127 |
| 7,714,560 | B2 * | 5/2010 | Fukumori ........... H02M 3/1588 323/225 |
| 2008/0246455 | A1 | 10/2008 | Chu et al. |
| 2010/0124086 | A1 | 5/2010 | Chen |
| 2010/0194370 | A1 | 8/2010 | Cheng |
| 2011/0110122 | A1 | 5/2011 | Chen et al. |
| 2011/0148377 | A1 | 6/2011 | Schiff et al. |
| 2015/0124494 | A1 * | 5/2015 | Malinin ............ H02M 3/33592 363/21.14 |
| 2015/0124495 | A1 * | 5/2015 | Kong ................ H02M 3/33592 363/21.14 |

OTHER PUBLICATIONS

NXP B.V., TEA192TS, GreenChip Sychroous Rectifier Controller, Product Data Sheet, Rev. 2, 14 pgs. (Jun. 28, 2012).
NXP B.V., TEA1791AT, GreenChip Sychroous Rectifier Controller, Product Data Sheet, Rev. 01, 13 pgs. (Jun. 7, 2010).
Extended European Search Report for EP Patent Appln. No. 13194509.9 (Apr. 28, 2014).

\* cited by examiner

Primary Examiner — Emily P Pham (57) ABSTRACT

Consistent with an example embodiment, a synchronous rectifier controller for a switched mode power supply comprises a transformer with a secondary side winding and a synchronous rectifier transistor with a gate, a source and a drain; the source and drain provide a conduction channel coupled to the secondary side winding. The controller comprises an input terminal for receiving an input signal related to a voltage at the drain, an output terminal configured to provide an output signal for setting a logic state of the gate, and circuitry having a first threshold and a second threshold. The circuitry is configured to generate the output signal and determine a time period in accordance in accordance with a comparison between the input signal and the first threshold; and in accordance with a comparison between the input signal and the second threshold, set the first threshold in accordance with the time period.

13 Claims, 9 Drawing Sheets

SYNCHRONOUS RECTIFIER CONTROLLER FOR A SWITCHED MODE POWER SUPPLY

CROSS-REFERENCE TO RELATED APPLICATIONS

This application claims the priority under 35 U.S.C. §119 of European patent application no. 13194509.9, filed on Nov. 26, 2013, the contents of which are incorporated by reference herein.

The invention relates to a switched mode power supply such as a flyback or buck converter that comprises a synchronous rectifier. In particular, although not exclusively, the invention relates to a synchronous rectifier controller for a switched mode power supply.

Figure 1:
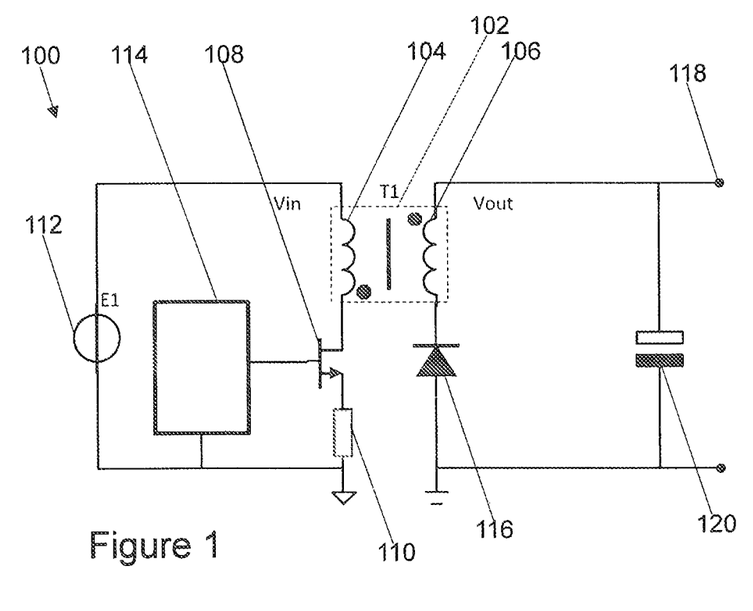
FIG. 1 shows a flyback converter with a diode for rectification.

Flyback or buck converters are commonly used to provide a regulated DC output in a power supply unit. FIG. 1 shows a flyback converter 100 comprising a transformer 102 with a primary winding 104 and a secondary winding 106. The transformer 102 defines primary and secondary sides of the flyback converter 100 that are associated with the respective primary and secondary windings 104, 106.

The primary side of the flyback converter 100 comprises a switching transistor 108 with a gate, a source and a drain. The switching transistor 108 may also be referred to as a primary transistor. The source and drain of the switching transistor 108 define a conduction channel that is connected in series with the primary winding 104 and a load 110. The drain of the switching transistor 108 is coupled to the primary winding 104. The source of the switching transistor 108 is coupled to the load 110. This series arrangement is coupled across a voltage source 112 that is to be converted by the flyback converter 100.

A primary side controller 114 is coupled to the gate of the switching transistor 108. The primary side controller 114 controls the gate of the switching transistor 108 such that a desired amount of energy is passed from the primary winding 104 to the secondary winding 106 during each power supply cycle.

The secondary side of the flyback converter 100 comprises a diode 116 coupled in series with the secondary winding 106 of the transformer 102. This series arrangement is provided between a voltage output 118 and ground. A cathode of the diode 116 is coupled to the secondary winding 106. An anode of the diode 116 is coupled to ground. The diode 116 acts as a rectifier for the signal transferred to the secondary side. A smoothing capacitor 120 is provided in parallel with the secondary winding 106 and diode 116. The smoothing capacitor 120 has a first plate coupled to the secondary winding 106 and a second plate coupled to ground. An output voltage 118 is provided at the first plate of the smoothing capacitor 120.

The ground of the primary and secondary sides are isolated from one another for safety reasons.

Alternative rectification techniques may be used. For example, NXP Semiconductor Corp. application note TEA1791AT "*GreenChip synchronous rectifier controller*", Revision 1, 7 Jun. 2010 (http://www.nxp.com/documents/data_sheet/TEA1791AT.pdf) discloses a synchronous Rectifier (SR) controller IC for a switched mode power supply with a synchronous rectifier. A high level of integration in the IC allows for a cost-effective power supply with a very low number of external components.

However, as the efficiency requirements demanded of such systems become ever more stringent, the use of MOSFET synchronous rectifiers with lower conduction losses has become desirable. In the development of the present invention it has been observed that the use of such MOSFETs places increased demands on synchronous rectifier threshold measurement and timing control schemes. Existing synchronous rectifier control schemes are unable to control the rectifier accurately when using low ohmic MOSFETs because the accurate timing of such systems depends on precise measurements of a potential dropped across the MOSFET. The potential dropped across the MOSFET is proportional to its resistance in a conductive state. When a lower conduction loss MOSFET is used in an attempt to improve efficiency, the potential dropped can become insufficient for the controller to measure accurately. This problem is exacerbated for low power output applications.

According to a first aspect of the invention there is provided a synchronous rectifier controller for a switched mode power supply comprising an inductive winding and a synchronous rectifier transistor with a gate, a source and a drain, the source and drain providing a conduction channel coupled to the inductive winding, the controller comprising:
an input terminal for receiving an input signal related to a voltage at the drain;
an output terminal configured to provide an output signal for setting a logic state of the gate; and
circuitry having a first threshold and a second threshold, the circuitry configured to:
generate the output signal in accordance with a comparison between the input signal and the first threshold;
determine a time period in accordance with the comparison between the input signal and the first threshold and in accordance with a comparison between the input signal and the second threshold; and
set the first threshold in accordance with the time period.

Embodiments of the invention can therefore automatically adapt the timing of a synchronous rectifier metal-oxide field effect transistor (SR MOSFET) by modifying the first threshold level in a closed loop. The control scheme automatically adjusts for delays and offsets which are present in practical implementations due to, for example, component tolerance and temperature variations. These inevitable offsets and delays are compensated for by the timing control loop. Due to the improved timing operation of the synchronous rectifier, the efficiency of the switched mode power supply as a whole can be improved. In addition, due to the automatic adjustment of the first threshold, an accurate reference or detection level as used in the prior art may not be required. Embodiments of the invention are therefore suitable for use with a range of synchronous rectifier transistors, including very low ohmic MOSFETs.

It will be appreciated that the controller can be used with a flyback or buck converter as a switched mode power supply, for example. The switched mode power supply may comprise a transformer. The inductive winding may be a secondary side winding of the transformer.

The first threshold may be different to the second threshold. The first and second thresholds may be in the same domain as the input signal. For example, the first and second thresholds and the input signal may all be in the voltage domain. That is, the first and second thresholds may be voltage values that are compared with a voltage of the input signal.

The output signal may be set to a low logic state in accordance with a comparison between the input signal and the first threshold. The gate and the conduction channel of the synchronous rectifier transistor may be disabled in the low logic state. That is, the conduction channel may be in a non-conducting state when the output is set to the low logic state. The output signal may be set to the low logic state when the input signal becomes equal to or crosses the first threshold. The output signal may be set to the low logic state when the input signal becomes greater than the first threshold. The time period may begin when the input signal becomes equal to or crosses the first threshold. The time period may begin when the input signal becomes greater than the first threshold. The time period may end when the input signal becomes equal to or crosses the second threshold. The time period may end when the input signal becomes greater than the second threshold. The circuitry may be configured to set the first threshold proportional to the time period. The first threshold may correspond to a drain voltage that is negative with respect to the source. The second threshold may correspond to a drain voltage that is positive with respect to the source.

The circuitry may comprise a timing capacitor. The circuitry may be configured, in order to measure the time period, to initiate supply of a current to the timing capacitor in response to the input signal becoming equal to or crossing the second threshold such that a timing charge is accumulated by the timing capacitor. The circuitry may be configured, in order to measure the time period, to cease supply of the current to the timing capacitor in response to the input signal becoming equal to or crossing the second threshold.

The circuitry may comprise a signal conditioning unit. The signal conditioning unit may be configured to buffer the timing charge of the timing capacitor. The signal conditioning unit may be configured to set the first threshold in accordance with the timing charge.

The synchronous rectifier transistor may have a drain-source conduction resistance equal to or less than 5, 10, 20 or 50 milliohms.

The circuitry may be configured to set the output signal to a high logic state in accordance with a comparison between the input signal and a third threshold, which may also be referred to below as a zeroth threshold. The gate and the conduction channel of the synchronous rectifier transistor may be enabled in the high logic state. That is, the conduction channel may be in a conducting state when the output is set to high logic state.

The circuitry may comprise a filter configured to provide a filtered input signal. Noise filtering can be used because any delay caused by the filtering may be automatically compensated for by the controller. The controller may be configured to set the output signal in accordance with a comparison between the filtered input signal and the first threshold.

According to a further aspect of the invention there is provided a switched mode power supply comprising:
  an inductive winding;
  a synchronous rectifier transistor with a gate, a source and a drain; and
  the synchronous rectifier controller according to any preceding claim,
  wherein the source and drain of the transistor provide a conduction channel coupled to the inductive winding.

It will be appreciated that a controller that is suitable for use with a secondary side winding of a transformer may also be suitable for use with any inductive winding.

The conduction channel may be coupled in series with the secondary side winding. The switched mode power supply may be a buck converter.

The switched mode power supply may comprise a transformer. The inductive winding may be a secondary side winding of the transformer. The switched mode power supply may be a flyback converter.

According to a further aspect of the invention there is provided a power supply unit comprising the switch mode power supply described above.

One or more embodiments of the invention will now be described, by way of example only, and with reference to the accompanying figures in which:

FIG. 6b shows signal profiles at nodes in the example improved synchronous rectifier of FIG. 4b corresponding to the two example signal profiles of FIG. 6a;

Corresponding reference numerals are used between the figures to refer to similar features.

Figure 2A:
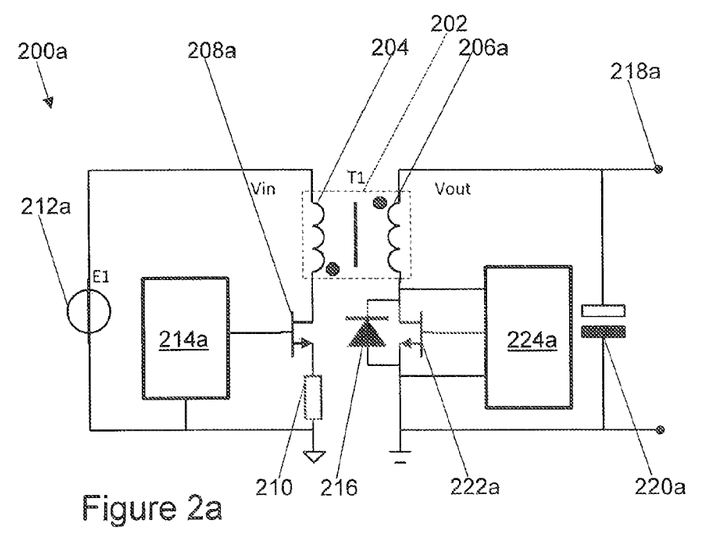
FIG. 2a shows a flyback converter with a synchronous rectifier.

FIG. 2a shows a flyback converter 200a with a synchronous rectifier on the secondary side. Several of the features of the flyback converter 200a, including a transformer 202 with primary and secondary side windings 204, 206a, switching (primary) transistor 208a, load 210, voltage source 212a, primary side controller 214a, output voltage 218a and smoothing capacitor 220a are similar to those of FIG. 1. Further discussion will be confined, for the most part, to differences between the flyback converter 200a and the flyback converter of FIG. 1.

The flyback converter 200a comprises a synchronous rectifier transistor 222a, which may also be referred to as a secondary transistor. The synchronous rectifier transistor 222a has a gate, a source and a drain. The source and drain of the synchronous rectifier transistor 222a provide a conduction channel that is provided in parallel with the diode 216. The conduction channel is provides in series with the secondary side winding 206a of the transformer 202. The drain of the synchronous rectifier transistor 222a is coupled to the secondary winding 206a. The source of the synchronous rectifier transistor 222a is coupled to ground.

A synchronous rectifier controller 224a is coupled to the gate of the synchronous rectifier transistor 222a. The synchronous rectifier controller 224a controls the gate such that a low impedance conduction path is provided during a desired half of the switching cycle in order to provide a rectified signal at the output with lower rectification losses than would be provided by the diode 216 alone (as in FIG. 1). The synchronous rectifier transistor 222a is driven such that the secondary side drain source voltage, Vds, is substantially lower than a typical forward voltage drop of the diode 216. In an alternative embodiment, the diode 216 of the synchronous rectifier may be omitted.

Figure 2B:
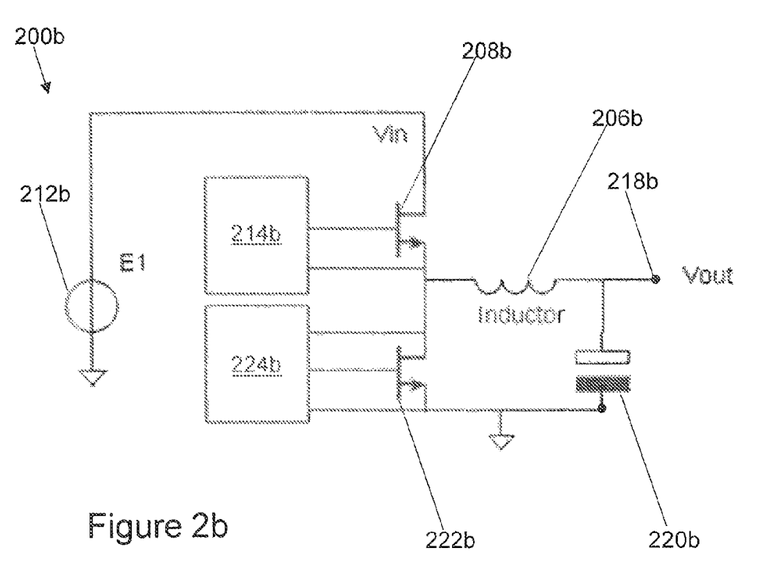
FIG. 2b shows a buck converter with a synchronous rectifier.

The synchronous rectifier controller 224a, 224b may be provided by a controller similar to TEA1791 or NXP semiconductor corporation Application note TEA1792TS "GreenChip synchronous rectifier controller", Rev. 2, 26 Jun. 2012 (http://wvvw.nxp.com/documents/data_sheet/TEA1792TS.pdf). Such controllers measure the drain-source voltage dropped (Vds) across the synchronous rectifier transistor 222a, 222b in order to control the synchronous rectification function. For a very low resistance MOSFET, the use of which is desirable in order to improve the efficiency of the system, the measured Vds signal becomes very small. In such circumstances it can be difficult or impossible to control timing of the synchronous rectifier transistor 222a, 222b with sufficient accuracy using such controllers.

FIG. 2b shows a buck converter 200b that may be used as an alternative switched mode power supply to the flyback converter 200a. The buck converter 200b comprises a switching (primary) transistor 208b and a synchronous rectifier (secondary) transistor 222b. The switching transistor 208b and synchronous rectifier transistor 222b each has a gate, a source and a drain. The sources and drains provide respective conduction channels that are provided in series with each other. The series arrangement of the conduction channels is provided in parallel across a voltage source 212b. The drain of the switching transistor 208b is coupled to the voltage source 212b. The source of the switching transistor 208b is coupled to the drain of the synchronous rectifier transistor 222b. The source of the synchronous rectifier transistor 222b is coupled to ground.

An inductive winding 206b is provided, instead of a transformer, in this example. The inductive winding 206b has a first terminal and a second terminal. The first terminal of the inductive winding 206b is coupled to the drain of the synchronous rectifier transistor 222b. A second terminal of the inductive winding 206b provides the output voltage 218b. A smoothing capacitor 220b is provided with a first plate and a second plate. The first plate is coupled to the second terminal of the inductive winding 206b and the second plate is coupled to ground.

A primary controller 214b is coupled to the gate of the switching (primary) transistor 208b. The primary controller 214b controls the gate of the switching transistor 208b such that a desired amount of energy is passed from the voltage source 212b to the inductive winding 206b during an appropriate part of each power supply cycle.

A synchronous rectifier (secondary) controller 224b is coupled to the gate of the synchronous rectifier (secondary) transistor 222b. The synchronous rectifier (secondary) controller 224b may be operated so as to maximise resonance in the inductive winding. In order to prevent shorting of the voltage source 212b, the synchronous rectifier (secondary) controller 224b ensures that the primary and secondary transistors 208b, 222b never conduct at the same time.

Figure 3A:
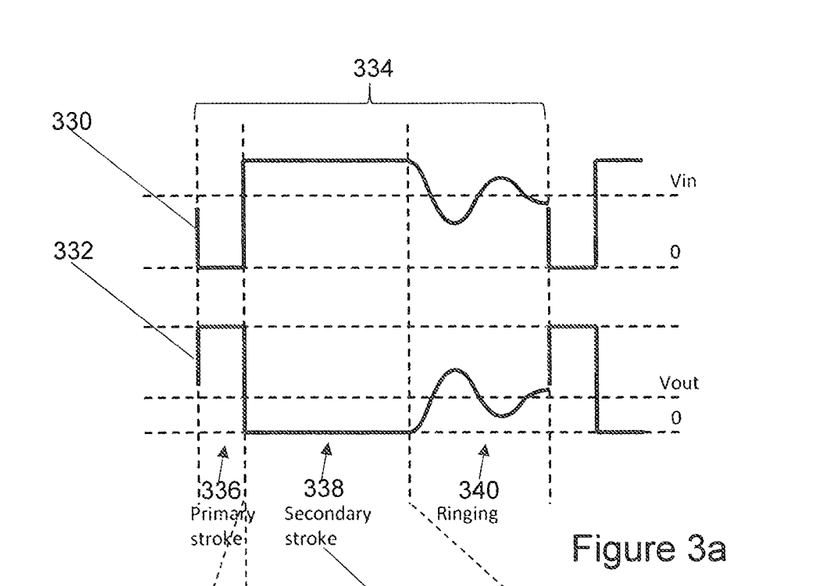
FIG. 3a shows transistor drain signals at primary and secondary transistors of the flyback converter of FIG. 2a or buck converter of FIG. 2b during a power supply period.
Figure 3B:
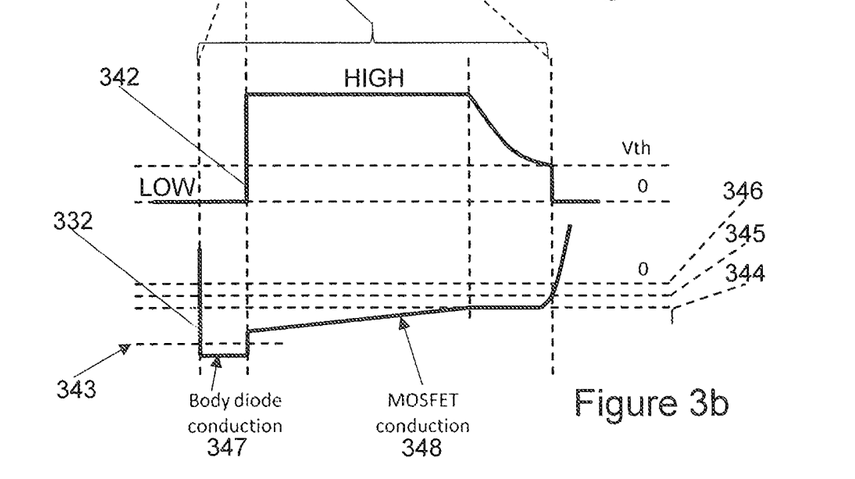
FIG. 3b shows a portion of the secondary transistor drain signal of FIG. 3a in further detail and a corresponding secondary transistor gate signal.

FIG. 3 illustrates typical signals derived from the circuit of FIG. 2a in the case that the synchronous rectifier controller is implemented using TEA1791 or TEA1792 as a controller, for example. However, several of the features shown in FIG. 3 are also representative of signals derived from the circuit of FIG. 2b, as discussed below.

FIG. 3a shows a signal at a drain of a switching (primary) transistor 208a of FIG. 2, which is referred to as a primary drain signal 330, and a signal at the drain of the synchronous rectifier (secondary) transistor 222a, 222b of FIG. 2a or 2b, which is referred to as a secondary drain signal 332. The primary and secondary drain signals 330, 332 are shown during a whole power supply period 334 and during the beginning of a subsequent power supply period. The whole power supply period 334 comprises a primary stroke 336, a secondary stroke 338 and a ringing period 340. The primary and secondary drain signals 330, 332 are voltage levels and the power supply period 334 is in the time domain and therefore FIG. 3 shows voltage levels with respect to time. The time axis of FIG. 3a is not to scale.

The synchronous rectifier controller controls 224a, 224b the gate of the synchronous rectifier transistor 222a, 222b in response to the voltage at the drain. During the primary stroke 336, the primary drain signal 330 is low (at zero volts) and the secondary drain signal 332 is high (above the output voltage). During the secondary stroke 338, the primary drain signal 330 is high (above the input voltage) and the secondary drain signal 332 is low (at zero volts). During the ringing period 340, the primary drain signal 330 oscillates such that its voltage settles at the input voltage. The secondary drain signal 332 oscillates such that its voltage settles at the output voltage during the ringing period 340.

FIG. 3b further illustrates the secondary drain signal 332 together with a corresponding signal at the gate of the synchronous rectifier transistor 222a, 222b, referred to as a secondary gate signal 342, during a time period including the secondary stroke 338. The time axis of FIG. 3b is also not to scale.

A number of different voltage thresholds for the secondary drain signal 332 are illustrated in FIG. 3b. These thresholds include, in order from lowest to highest potential, a zeroth threshold level 343, a fixed regulation level 344, a deactivation level 345 and a zero volt level 346.

At the end of the primary stroke 336, the secondary drain signal 332 falls below the zeroth threshold level 343 and an initial delay period 347 of body diode conduction starts. The initial delay period 347 is caused by inefficiencies in the detection and drive circuitry of the controller 224a, 224b. The initial delay period 347 ends when the synchronous rectifier controller detects that the secondary drain signal 332 has fallen below the zeroth threshold level 343. In response, the synchronous rectifier controller 224a, 224b sets the secondary gate signal to a high logic state. The enabling of the gate of the synchronous rectifier transistor 222a, 222a starts a period of MOSFET conduction 348. At the start of this period of MOSFET conduction 348, the secondary drain signal 332 initially increases asymptotically, but by a small amount so the initial rise does not pass the fixed regulation level 344.

When the stored energy in the transformer 202 is transferred to the secondary side winding 206, the current though the synchronous rectifier transistor 222a decreases. The current is from the source to the drain of the synchronous rectifier transistor 222a, 222b during the secondary stroke 338. The secondary drain signal 332 therefore increases linearly towards the zero volt level 346 during the period of MOSFET conduction 348.

The controller 224a, 224b begins to reduce the gate level when the fixed regulation level 344 is reached in order to ensure suitable switch-off timing of the synchronous rectifier transistor 222a, 222b. This action maintains a constant drain voltage (Vds, secondary drain signal 332) at the fixed regulation level 344.

When the current from the transformer 202 reaches zero, regulation of the drain voltage (Vds, secondary drain signal 332) is no longer possible and so secondary drain signal 332 increases above the deactivation level 345. The controller 224a, 224b switches off the gate in response to the drain voltage 332 increasing above the deactivation level 345.

As mentioned previously, it is desirable to use a synchronous rectifier transistor 222a, 224b that exhibits very low conduction losses in order to improve the efficiency of the system. Therefore, a MOSFET with a very low ohmic conduction channel may be chosen as the synchronous rectifier transistor 222a, 224b. The conduction resistance of the MOSFET may be chosen to be 5 or 10 mohms, for example.

The control schemes used by TEA1791 and TEA 1792 require that the regulation level 344 and the deactivation level 345 must be as close to the zero volt level 346 as possible in order to provide the desired efficiency. In such circumstances, only a small offset or delay in the detection circuit would result in the effective de-activation level 344 becoming positive (greater than the zero volt level 346). Such an error would result in incorrect operation as the MOSFET of the synchronous rectifier may be switched off too late, resulting in additional losses and possible energy feedback to the primary side of the transformer. Either outcome is clearly undesirable.

The precise level of the thresholds depends on the controller implementation. For example, TEA1791 has a fixed regulation level 344 of −55 mV and TEA1792 has a fixed regulation level 344 of −30 mV or −42 mV. Both TEA1791 and TEA1792 have a deactivation level 345 of −12 mV.

For the −30 mV regulation level 344, the TEA1792 will start reducing the gate driving potential at a synchronous rectifier transistor drain-source current of −3A (where the drain-source conduction resistance of the MOSFET in the conducting, or on, state (RdsOn) is 10 mohm). Controlling the gate to maintain −30 mV and not reaching −12 mV due to delays in the control circuit is difficult because different types of MOSFET have different drive requirements. In addition, 100 mW is dissipated by the synchronous rectifier transistor at a current of 3A and a drain-source voltage drop of 30 mV. Such a power dissipation is unacceptable for many applications.

An improved synchronous rectifier controller is proposed in order to address the problems encountered with controlling a synchronous rectifier transistor provided by a low ohmic MOSFET (such as a MOSFET where RdsOn is 10 mohm or less, for example).

Figure 4A:
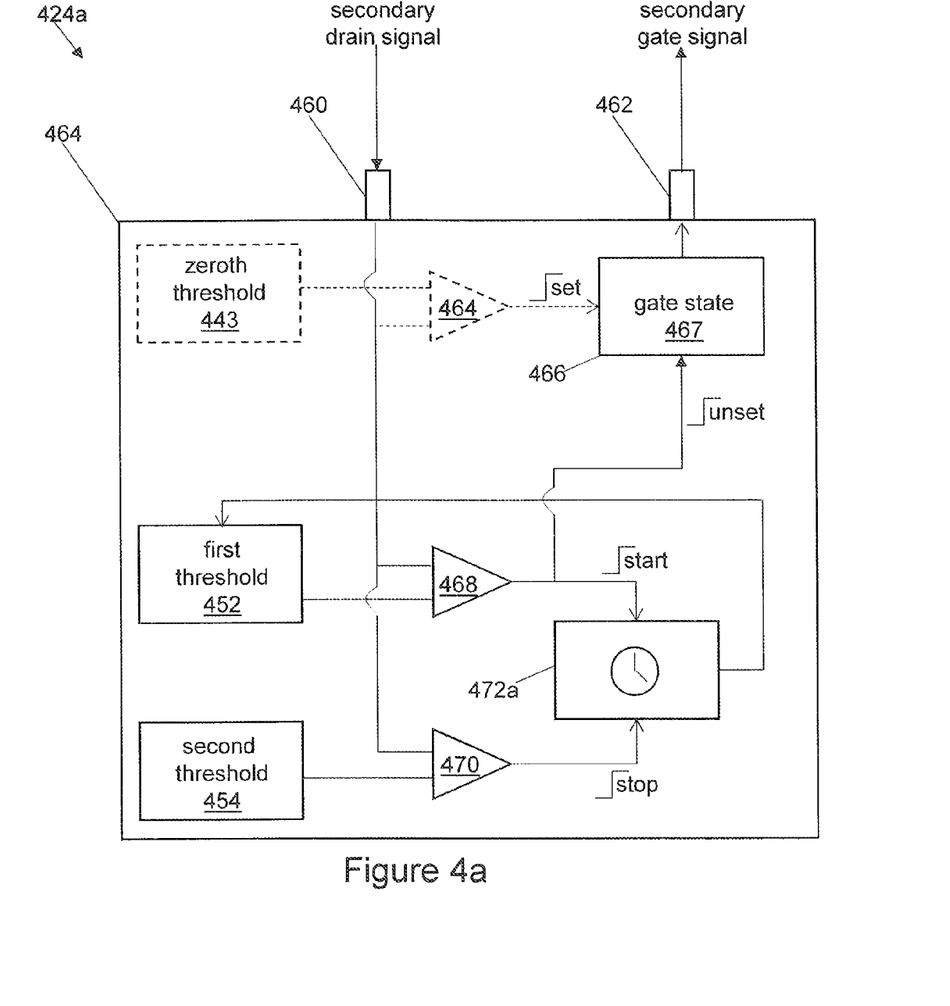
FIG. 4a shows a block diagram of an improved synchronous rectifier controller.

FIG. 4a shows a block diagram of an improved synchronous rectifier controller 424a for controlling the flyback converter of FIG. 2. The synchronous rectifier controller 424a comprises an input terminal 460 and an output terminal 462. The input terminal 460 is configured to receive the secondary drain signal or another input signal related to a voltage at the drain of the synchronous rectifier transistor. The output terminal 462 is configured to provide a secondary gate signal, or output signal, for setting a logic state of the gate of the synchronous rectifier transistor.

The synchronous rectifier controller 424a also comprise circuitry 464 having an optional zeroth threshold 443, a first threshold 452 and a second threshold 454.

The circuitry 464 optionally includes a zeroth comparator 464 configured to compare the input signal with the zeroth threshold 443 and set a logic state 467 to be high when the input signal falls below the zeroth threshold 443. The circuitry 464 generates the output state based on the logic state 467 such that the gate of the synchronous rectifier transistor is enabled when the logic state 467 is set high and the gate is disabled when the logic state is low. Source-drain conduction through the synchronous rectifier transistor is permitted when the gate is enabled and prevented when the gate is disabled.

A first comparator 468 is configured to compare the input signal with the first threshold 452 and unset the logic state 467 to be low when the input signal rises above the first threshold 452. In this way, the circuitry 464 is configured to generate the output signal in accordance with a comparison between the input signal and the first threshold.

The first comparator 468 is also arranged to provide an outcome of its comparison to a first threshold setting unit 472. A second comparator 470 is configured to compare the input signal with the second threshold 454 and provide an outcome of the comparison to the first threshold setting unit 472.

The first threshold setting unit 472a is configured to determine a time period in accordance with the comparison between the input signal and the first threshold 452 and in accordance with a comparison between the input signal and the second threshold 454. The first threshold setting unit 472a sets the first threshold 452 in accordance with the determined time period. The amended (or maintained) first threshold 452 is then used for comparison in future power supply periods.

As further discussed below with reference to FIGS. 5 to 7, the improved synchronous rectifier controller 424a implements a scheme for automatically adapting a duty cycle of the synchronous rectifier transistor, making the controller 424a suitable for use with a very low ohmic SR MOSFET. The control scheme adjusts for delays and offsets which are always present in a practical implementation. As such, the controller 424a does not need to rapidly respond to an accurate reference or threshold level being reached. The first threshold level 452 is automatically adjusted by the controller which provides a closed loop system. In general, the inevitable offsets and delays within the control loop are at least partially compensated for by the timing control loop.

If an offset or delay is produced by the first threshold comparator 468, this offset or delay will be compensated by the control scheme. The zeroth and second threshold comparators 464, 470 can also, in practice, have offsets associated with them. However, as the rate of change of the secondary drain signal with respect to time around the zeroth and second thresholds 443, 454 is typically large, such offsets may be acceptable and have an inconsequential effect on the timing scheme.

The control scheme is therefore insensitive to delays and offset, making it suitable for very low ohmic SR MOSFETs in operating conditions where the secondary drain signal will be very small. In some examples, offsets that are larger than the secondary drain signal itself can be compensated for and so the controller can maintain proper synchronous rectification timing.

Figure 4B:
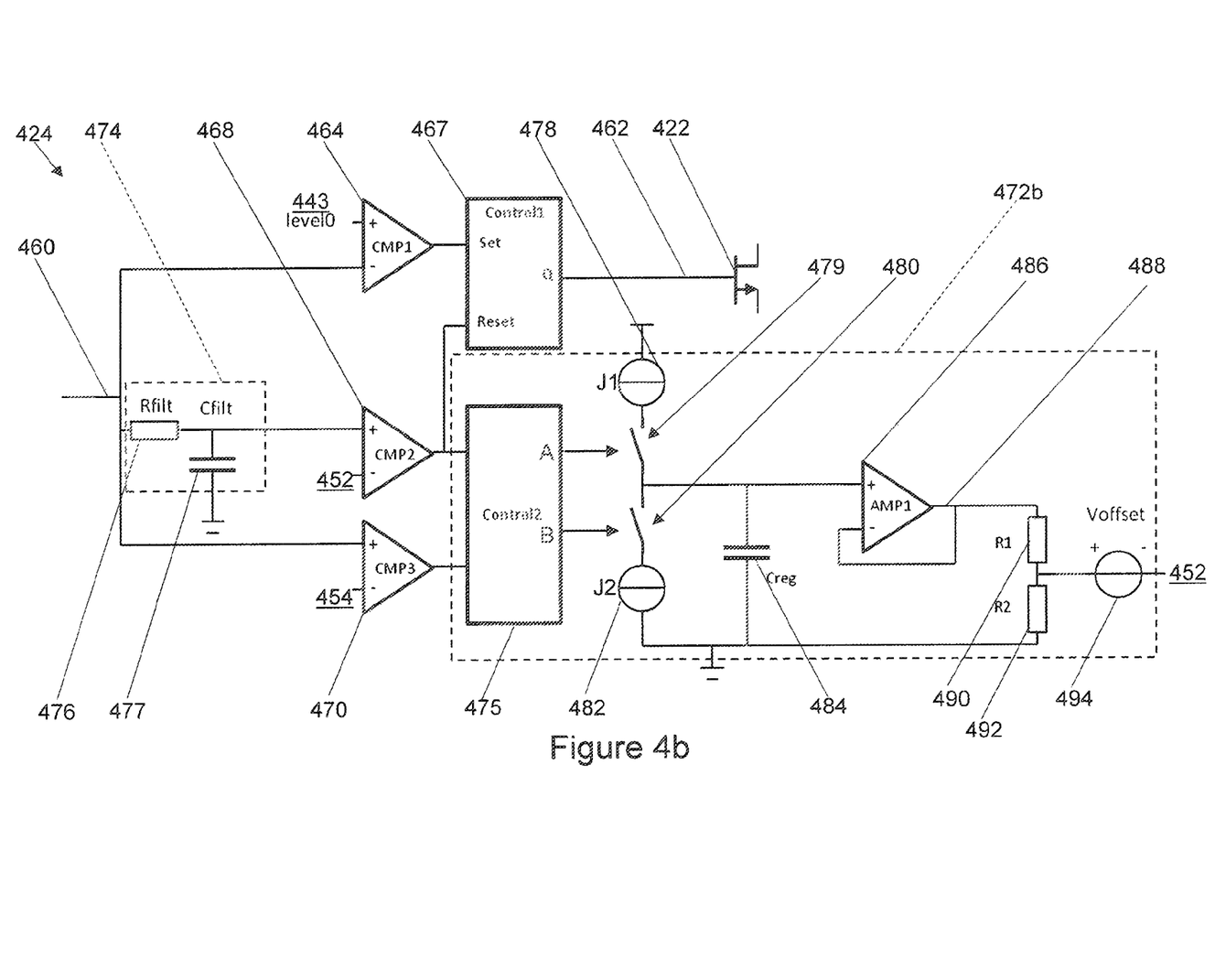
FIG. 4b shows an example implementation of the improved synchronous rectifier controller.

FIG. 4b shows an example implementation of an improved synchronous rectifier controller 424b. The same reference numerals are used between FIGS. 4a and 4b to refer to corresponding components.

The controller 424b comprises a filter 474 coupled between the input terminal 460 and a non-inverting input of the first comparator 468. The filter 474 includes a resistor 476 and a capacitor 477. The resistor 476 has a first terminal coupled to the input terminal 460 and a second terminal coupled to the first comparator 468. The capacitor has a first plate coupled to the line between the input terminal 460 and the first comparator 468 and a second plate coupled to ground. The effect of the filter 474 is discussed below with reference to FIG. 8.

An example implementation of the first threshold setting unit 472b is shown in FIG. 4b.

The first threshold setting unit 472b comprises a current controller 475 and a series arrangement of a potential, a first current source 478, a first current switch 479, a second current switch 480, a second current source 482 and ground. The current controller 475 receives the result of the comparisons made by the first and second comparators 452, 454 and controls the first and second current switches 479, 480 in response to the comparisons. The operation of the current controller 475, and the first threshold setting unit 472b in particular, is discussed with reference to FIGS. 5c and 5d below.

A buffer capacitor 484 is provided in parallel with the series arrangement of the second current switch 480 and second current source 482. That is, the buffer capacitor 484 has a first plate coupled to a node between the first current switch 479 and second current switch 480 and a second plate coupled to ground. The first current source 478 is configured to provide a first current J1 to the buffer capacitor 484 when the first current switch 479 is closed. The second current source 482 is configured to draw a second current J2 from the buffer capacitor 484 when the second current switch 480 is closed.

A buffer amplifier 486 is provided in order to buffer a charge on the buffer capacitor 484. The buffer amplifier 486 has a non-inverting input coupled to the first plate of the buffer capacitor 484 (the node between the first current switch 479 and second current switch) and an inverting input coupled to an output 488 of the buffer amplifier 486. The output 488 of the buffer amplifier 486 provides as a first threshold signal via a potential divider and a voltage offset 494. The potential divider comprises a first resistor 490 in series with a second resistor 492. The potential divider is coupled between the output 488 of the buffer amplifier 486 and ground. The first threshold signal is taken at a node between the first and second resistors 490, 492, where the voltage offset 494 is applied.

The offset voltage 494 conditions the signal for the first threshold comparator 468. The signal conditioning is needed for a practical implementation because the first threshold level 452 is a very small negative voltage but for a practical implementation the voltage across the capacitor 484 may be provided as a larger signal so that it is less sensitive to noise. The offset voltage 494 may be implemented inside the first threshold comparator 468, but for clarity it is illustrated outside in this example.

The remainder of the arrangement of the first threshold setting unit 472b of FIG. 4b is similar to that of the first threshold setting unit 472a of FIG. 4, except that the output terminal 462 is shown coupled to a synchronous rectifier transistor 422 in FIG. 4b.

FIG. 5 illustrates typical signals derived from the circuit of FIG. 2a in the case that the controller is implemented using the improved controller of FIG. 4. However, several of the features shown in FIG. 5 are also representative of signals derived from the circuit of FIG. 2b using the improved controller of FIG. 4, as discussed below.

Figure 5A:
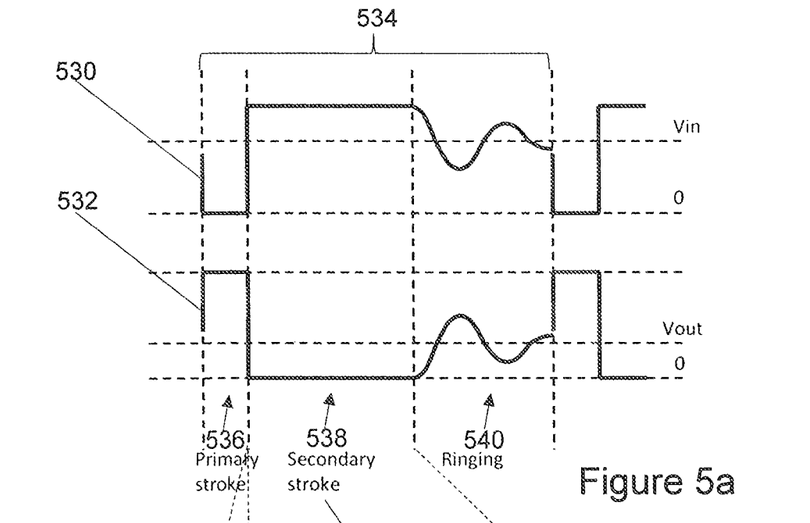
FIG. 5a is similar to FIG. 3a and shows transistor drain signals at primary and secondary transistors of the flyback converter of FIG. 2a or buck converter of FIG. 2b during a power supply period.
Figure 5B:
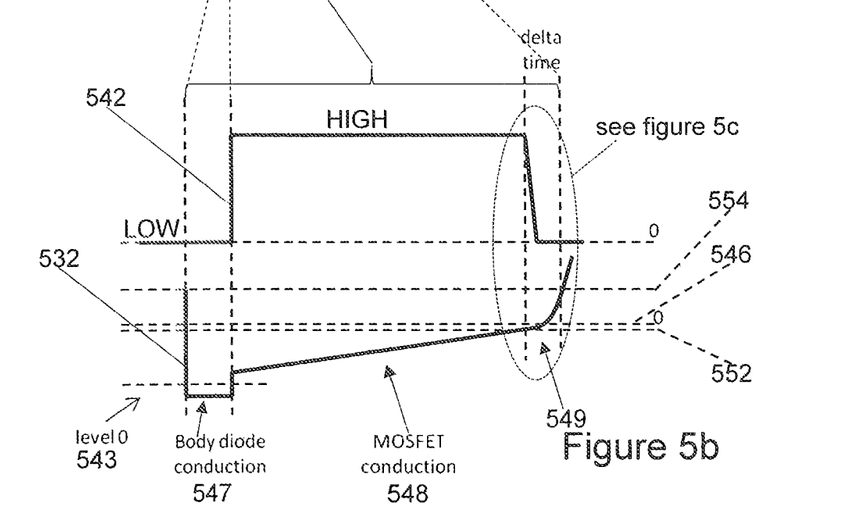
FIG. 5b shows a portion of the secondary transistor drain signal of FIG. 5a in further detail and a corresponding secondary transistor gate signal under the control of the improved synchronous rectifier controller.
Figure 5C:
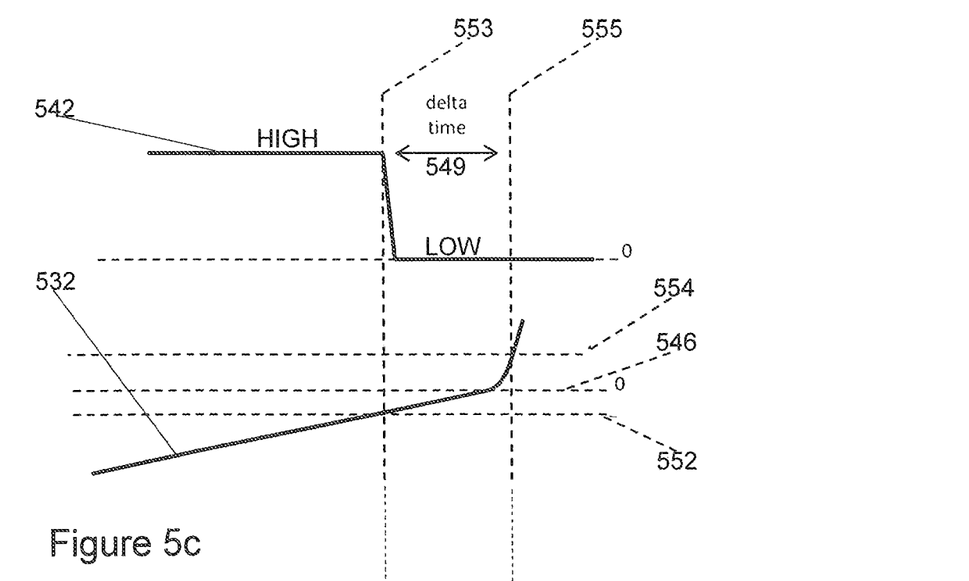
FIG. 5c shows a portion of the secondary transistor drain signal and corresponding secondary transformer gate signal of FIG. 5b.
Figure 5D:
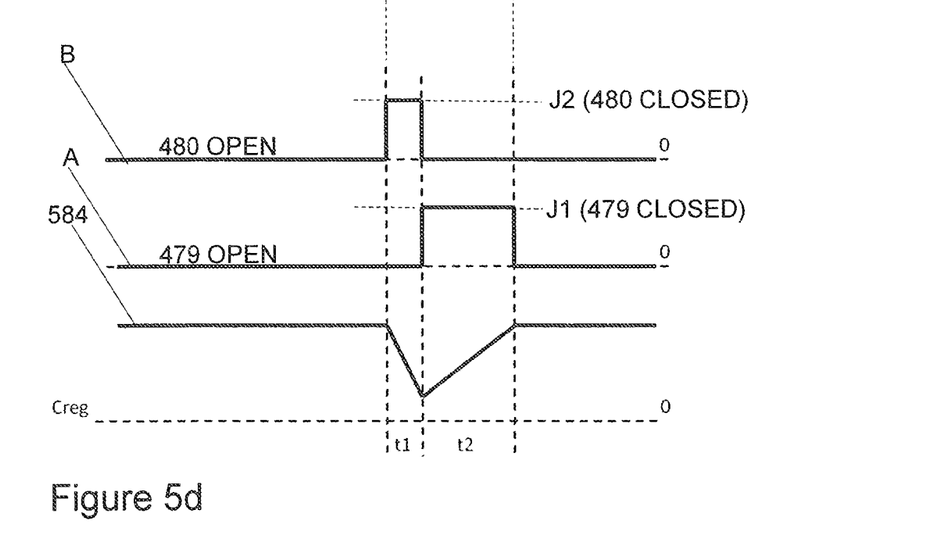
FIG. 5d shows signal profiles at nodes in the example improved synchronous rectifier controller of FIG. 4b corresponding to the signals shown in FIG. 5c.

FIGS. 5a to 5c relate equally to the synchronous rectifier controllers 424a, 424b of FIGS. 4a and 4b, but FIG. 5d relates exclusively to the synchronous rectifier controller 424b of FIG. 4b.

On the length scale shown, FIG. 5a is similar to FIG. 3a and is reproduced for ease of reference with FIG. 5b. As with FIG. 3a, FIG. 5a shows a primary drain signal 530 at the drain of the switching (primary) transistor 208a of FIG. 2. FIG. 5a also shows a secondary drain signal 532 at the drain of the synchronous rectifier (secondary) transistor 222a, 222b of either the flyback converter of FIG. 2a or the buck converter of FIG. 2b.

FIG. 5b further illustrates the secondary drain signal 532 during a secondary stroke 538 together with a secondary gate signal 542. The secondary drain signal 532 and secondary gate signal 542 are representative of either the flyback converter of FIG. 2a or the buck converter of FIG. 2b. The time axes in FIGS. 5a-d are not to scale.

The operation of the improved controller at the start of the secondary stroke 538 is similar to the functions performed by the TEA1791 or TEA1792 controllers. The zeroth comparator of the improved controller is configured to detect the drain signal 532 falling below the zeroth threshold 543. During an initial delay period 547, before the controller has time to react, body diode conduction occurs. Once the controller has detected that the drain signal 532 has fallen below the zeroth threshold 543 it sets the logic state to be high, such that the circuitry 464 of the controller 424b enables the gate of the synchronous rectifier transistor.

After the gate of the synchronous rectifier transistor is enabled, a period of MOSFET conduction 548 starts. At the start of this period of MOSFET conduction 548, the secondary drain signal 532 initially increases asymptotically, but by a small amount.

When the stored energy in the transformer is transferred to the secondary side winding, the current through the synchronous rectifier transistor decreases. The current is from the source to the drain of the synchronous rectifier transformer during the secondary stroke 538. The secondary drain signal 532 therefore increases linearly towards the zero volt level 546 during the period of MOSFET conduction 548.

Instead of the fixed regulation level used in the TEA1791 or TEA1792 controllers, the improved controller has an adaptable first threshold level 552. The improved controller also has a second threshold level 554 which is predetermined (or fixed). The second threshold level 554 is analogous to the deactivation level used by TEA1791 and TEA1792 except that, whereas the deactivation level is negative with respect to the zero volt level, the second threshold level 554 can be positive with respect to the zero volt level 546.

At the end of the secondary stroke period, the signals provided by the improved controller and their interactions with the thresholds differ from those illustrated in FIG. 3b in some important respects. FIG. 5c shows a portion of the secondary gate signal 542 and drain signal 532 of FIG. 5b at the end of the secondary stroke 548.

The first comparator of the improved controller 424b is configured to determine when the drain signal 532 rises to the first threshold level 552. In response to the drain signal 532 rising to the first threshold level 552, the circuitry of the controller 424b disables the gate of the synchronous rectifier transistor (sets the logic state to low). The drain signal 532 rising to the first threshold level 552 indicates a start 553 of a time period 549 (or delta time period). The first threshold setting unit 472b of the controller 424b measures the duration that has elapsed after the start 553 of the time period 549.

The second comparator of the improved controller 424b determines when the drain signal 532 rises to the second threshold level 554. The drain signal 532 rising to the second threshold level 554 indicates an end 555 of the time period 549. The first threshold setting unit 472b of the controller 424b ceases to measure the time period 549 once the end 555 has been reached.

The first threshold setting unit 472b sets (updates) the first threshold 552 in accordance with the determined time period 549. The amended (or maintained) first threshold 552 is then used for comparison of future power supply periods. In this way the control circuit can adapt the first threshold 552 such that the time period 549 is regulated to be a pre-defined value. In this way, the controller 424a may be used to ensure that the gate of the synchronous rectifier transistor is disabled at an instant that results in an optimal duration of the secondary stoke 538 and so automatically compensates for delays or component tolerances within the controller 424. The accuracy of the measurement is also improved because the second threshold level 554 can be chosen to be substantially greater than the detection level used in prior art controllers (which relate to the drain signal at the instant that deactivation should occur). As such, the difficulties in measuring small signals experienced by prior art implementations are avoided.

FIG. 5d shows signal profiles at nodes in the synchronous rectifier controller 424b of FIG. 4b corresponding to the signals shown in FIG. 5c.

At the start 553 of a time period 549, the current controller 475 closes the second current switch 480 for a shorting period, t1, which lasts a predetermined duration (see A). In the shorting period, t1, the buffer capacitor 484 is discharged and so a potential 584 across the capacitor 484 is reduced. That is, the second current J2 is drawn from the capacitor 484 when the second current switch 480 is closed. The first current switch 479 is open during the shorting period, t1 (see B). After the shorting period, t1, has elapsed, the current controller 475 opens the second current switch 480 and closes the first current switch 479 in order to charge the buffer capacitor 484 during a charging period, t2. That is, the first current J1 is delivered to the capacitor 484 when the first current switch 479 is closed. During the charging period, t2, the potential across the buffer capacitor 484 linearly increases. At the end 555 of the time period 549, the current controller 475 opens the first current switch 480 and so ends the charging period, t2. The potential across the buffer capacitor 484 at the end of the charging period, t2, is therefore related to the length of the time period 549.

In the case where the current-time product of the shorting period, t1, is the same as the current-time product of the charging period, t2, the timing loop is in regulation. That is, a required time period 549 has been established. Such an example is illustrated in FIG. 5d where the potential 584 across the capacitor 484 is the same before and after the time period 549.

Figure 6A:
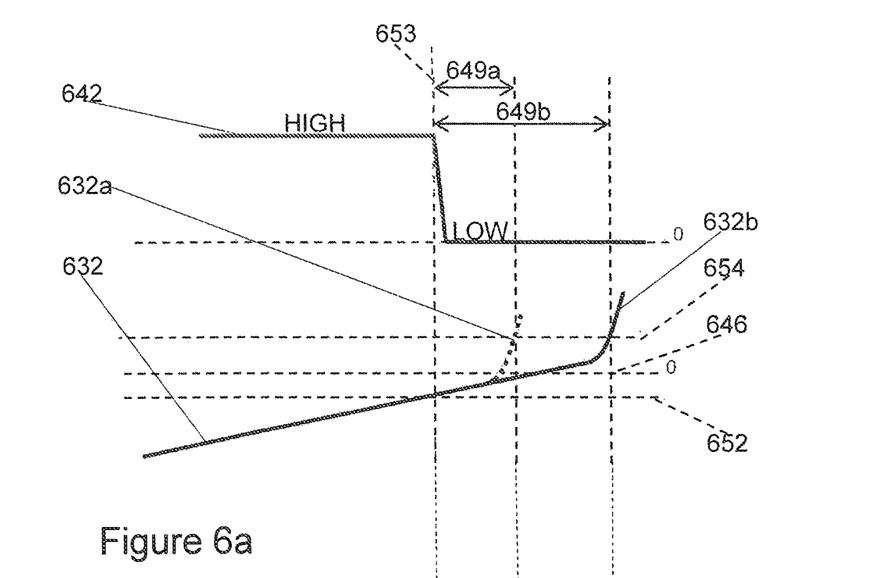
FIG. 6a shows two example signal profiles similar to those of FIG. 5c.

FIG. 6a shows two overlaid example signal profiles similar to those of FIG. 5c. However, in FIG. 6a, a first example drain signal 632a (dotted line) is illustrated that reaches the second threshold 654 too early, after a first time period 549a that is less than the predefined time period described with reference to FIG. 5c. FIG. 6a also shows a second example drain signal 632b (solid line) that reaches the second threshold 654 too late, after a second time period 549a that is longer than the predefined time period described with reference to FIG. 5c. Both the first and second time periods 549a, 549b start 653 when the secondary drain signal 632 crosses the first threshold 652.

Figure 6B:
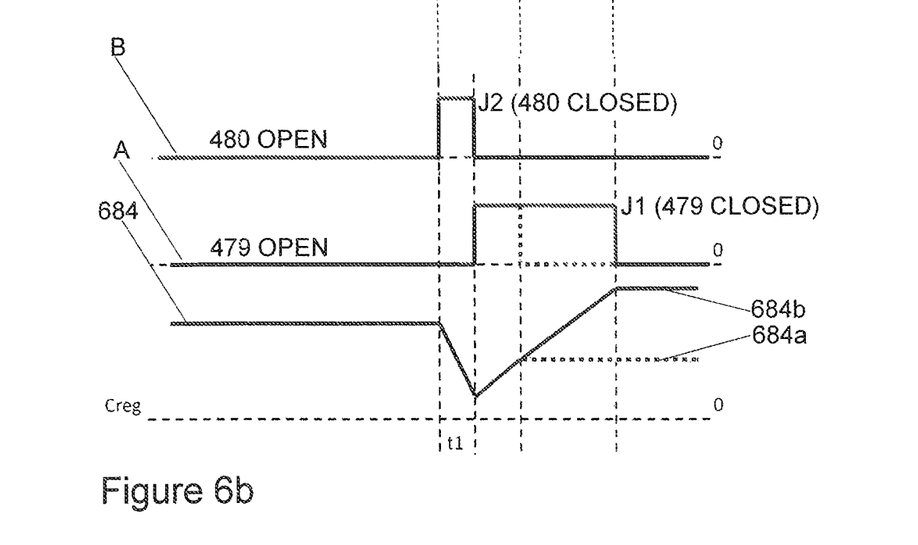

FIG. 6b shows signal profiles at nodes in the example improved synchronous rectifier that correspond to the two example signal profiles of FIG. 6a.

In the case of the first example drain signal 632a (dotted line), the charging period, t2a, is reduced and so less charge is provided to the buffer capacitor 684 in the time period 649a. As such, the potential 684a of the buffer capacitor 484 after the time period 549a is lower. The first threshold for the next cycle, which is related to the buffer capacitor 684a, will also be reduced.

In the case of the second example drain signal 632b (solid line), the charging period, t2b, is extended and so more charge is provided to the buffer capacitor 684 in the time period 649b. As such, the potential 684b of the buffer capacitor 484 after the time period 549b is higher. The first threshold for the next cycle will therefore be increased.

In each of these example cases, the improved controller 424a re-adjusts the first threshold 652 for the next cycle until the stable situation illustrated in FIG. 5d is achieved, that is where the potential 684 across the capacitor 484 is the same before and after the time period. The secondary stroke of the power supply cycle is provided for the required length of time when the secondary drain signal 632 crosses the second threshold level 654 after the same time period in each cycle of the power supply.

Figure 7:
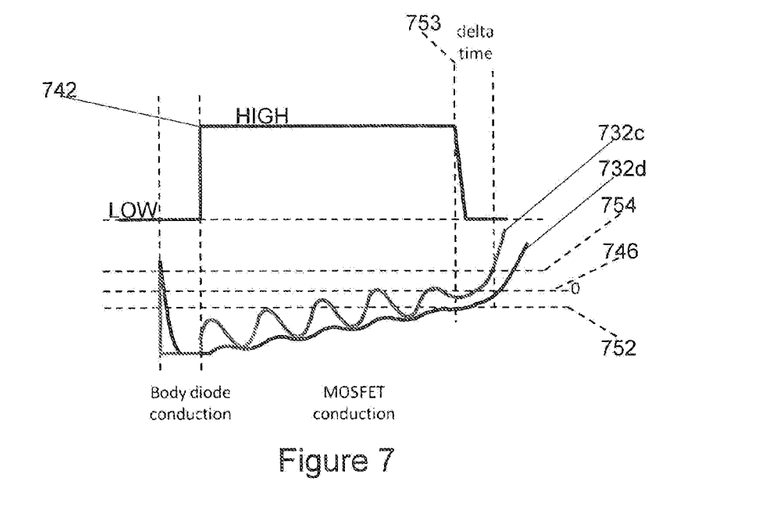
FIG. 7 shows the effect of noise on the drain signal of FIG. 5c.

FIG. 7 shows the effect of noise on the secondary drain signal. Secondary drain signals 732c, 732d from a practical implementation of the controller of FIG. 4b in the flyback converter 200a of FIG. 2b are illustrated. Similar signals may be expected for a practical implementation of the controller of FIG. 4b in the buck converter 200b of FIG. 2b.

An unfiltered drain signal 732c is representative of the signal at the input 460 of the controller 424b. The filter 474 filters the unfiltered drain signal 732c and provides a filtered drain signal 732d to the non-inverting input of the first threshold comparator 468. The unfiltered drain signal 732c has a ringing which typically occurs in practical applications due to leakage inductance of the transformer, for example. As this ringing may affect the timing, filtering may be required. Filtering, however, introduces an additional delay in the filtered drain signal 732d. This delay is compensated for by the timing scheme of the improved controller because the first threshold 752 is lowered so that in a subsequent power supply cycle the switch-off of the synchronous rectifier transistor is such that the time period is back on target again.

In FIG. 4b, the filtered drain signal 732d is provided to the first threshold comparator 468 only. The zeroth and second threshold comparators 464, 470 act on the unfiltered drain signal 732c.

Figure 8:
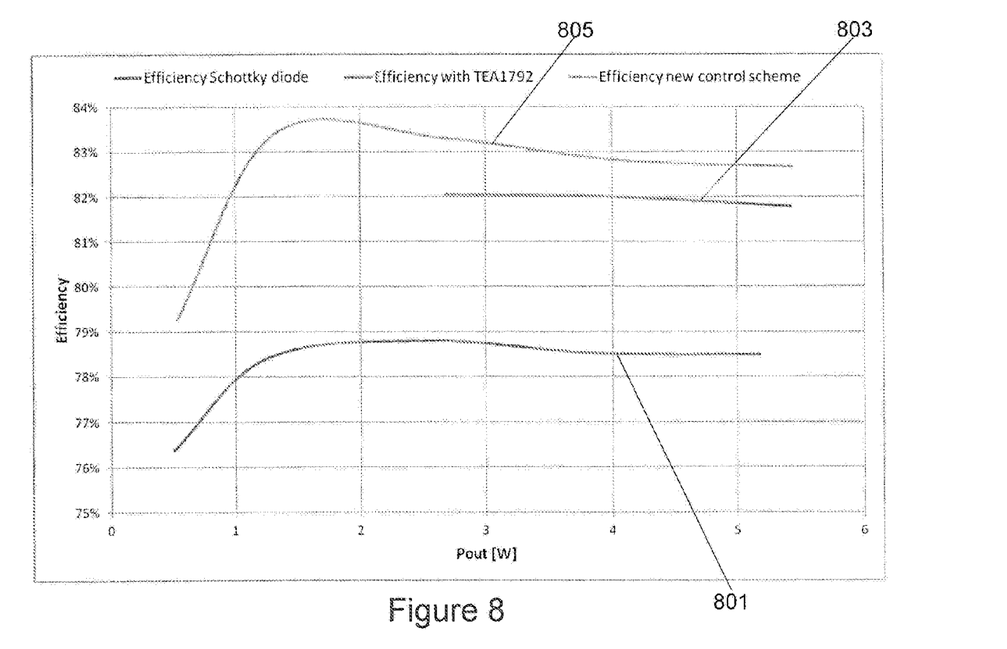
FIG. 8 shows a comparison of the efficiency of a switched mode power supply with the improved synchronous rectifier controller of FIG. 4b and conventional switched mode power supplies.

FIG. 8 shows a comparison between the efficiency of a flyback converter-type switched mode power supply 200a with the improved synchronous rectifier controller 424a, 424b and the efficiencies of switched mode power supplies 200a with conventional controllers. In each case a 5V, 5 W switched mode power supply is used A diode efficiency curve 801 is shown for a switched mode power supply 200a implemented using diode rectification (as in FIG. 1). The diode efficiency curve 801 is plotted over a power range of 0.5 W to 5.3 W. The efficiency curve 801 increases from around 76.3% at 0.5 W to a maxima of around 78.8% at around 2 to 2.5 W. The efficiency curve 801 decreases from this maxima to around 78.5% at 5.3 W.

A TEA1792 efficiency curve 803 is shown for a switched mode power supply 200a implemented with a TEA1792 controller (as in FIG. 2). The switched mode power supply is implemented using a low ohmic SR MOSFET with a conduction drain source resistance of 20 mohm. The TEA1792 efficiency curve 803 is only drawn for high output power (around 2.7 to 5.3 W) because the TEA1792 loses control due to the low ohmic SR MOSFET at low output power (below 2.7 W). The TEA1792 efficiency curve 803 is relatively insensitive to power output within the range shown and has an efficiency of approximately 82%.

An improved controller efficiency curve 805 is shown for a switched mode power supply 200a implemented with the improved controller 424a, 424b of FIG. 4. The improved controller efficiency curve 805 is plotted over a power range of 0.5 W to 5.3 W. The switched mode power supply is implemented using a low ohmic SR MOSFET with a conduction drain source resistance of 5 mohm. The efficiency curve 805 increases from around 79.2% at 0.5 W to a maxima of around 83.7% at around 1.7 W. The efficiency curve 805 decreases from this maxima to around 82.7% at 5.3 W.

Clearly SR has an efficiency advantage over diode rectification. The improved controller 424a, 424b also enables a higher efficiency than the TEA1792 (for the corresponding power output) and has the capability of maintaining control of the switched mode power supply at low output power.

The invention claimed is:

1. A synchronous rectifier controller for a switched mode power supply comprising an inductive winding and a synchronous rectifier transistor with a gate, a source and a drain, the source and drain providing a conduction channel coupled to the inductive winding, the synchronous rectifier controller comprising:
    an input terminal for receiving an input signal related to a voltage at the drain;
    an output terminal configured to provide an output signal for setting a logic state of the gate; and
    circuitry having a first threshold and a second threshold, the circuitry configured to:
        generate the output signal in accordance with a comparison between the input signal and the first threshold;
        determine a time period in accordance with the comparison between the input signal and the first threshold and in accordance with a comparison between the input signal and the second threshold;
        set the first threshold in accordance with the time period;
    wherein the circuitry comprises a timing capacitor and is configured, in order to measure the time period, to:
    initiate supply of a current to the timing capacitor in response to the input signal becoming equal to or crossing the first threshold such that a timing charge is accumulated by the timing capacitor; and
    cease supply of the current to the timing capacitor in response to the input signal becoming equal to or crossing the second threshold.

2. The synchronous rectifier controller of claim 1 wherein the output signal is set to a low logic state in accordance with a comparison between the input signal and the first threshold.

3. The synchronous rectifier controller of claim 2 wherein the output signal is set to the low logic state when the input signal becomes equal to or crosses the first threshold.

4. The synchronous rectifier controller according to claim 1,
    wherein the time period begins when the input signal becomes equal to or crosses the first threshold, and/or
    wherein the time period ends when the input signal becomes equal to or crosses the second threshold.

5. The synchronous rectifier controller according to claim 1, wherein the circuitry is configured to set the first threshold proportional to the time period.

6. The synchronous rectifier controller according to claim 1,
    wherein the first threshold corresponds to a drain voltage that is negative with respect to the source and the second threshold corresponds to a drain voltage that is positive with respect to the source.

7. The synchronous rectifier controller of claim 1 wherein the circuitry comprises a signal conditioning unit configured to buffer the timing charge of the timing capacitor and set the first threshold in accordance with the timing charge.

8. The synchronous rectifier controller according to claim 1,
    wherein the circuitry is configured to set the output signal to a high logic state in accordance with a comparison between the input signal and a third threshold.

9. The synchronous rectifier controller according to claim 1,
    wherein the circuitry comprises a filter configured to provide a filtered input signal and the controller is configured to set the output signal in accordance with a comparison between the filtered input signal and the first threshold.

10. The synchronous rectifier controller of claim 1 wherein the conduction channel is coupled in series with the secondary side winding.

11. The synchronous rectifier controller of claim 1 wherein the switched mode power supply is a buck converter.

12. The synchronous rectifier controller of claim 1 comprising a transformer, wherein the inductive winding is a secondary side winding of the transformer and the switched mode power supply is a flyback converter.

13. A power supply unit comprising the switch mode power supply of claim 1.

* * * * *